Feb. 16, 1971 H. G. FERGUSON 3,563,637
ADJUSTABLE PLURAL LENS SYSTEM
Filed May 19, 1969
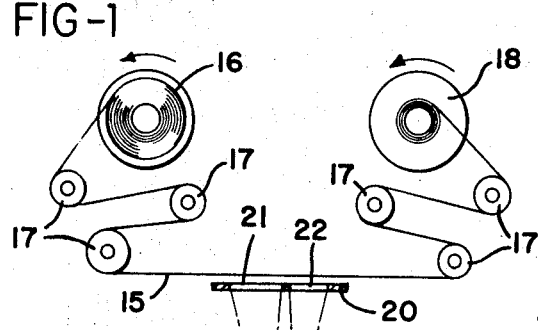
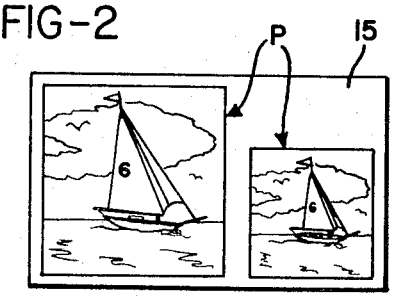
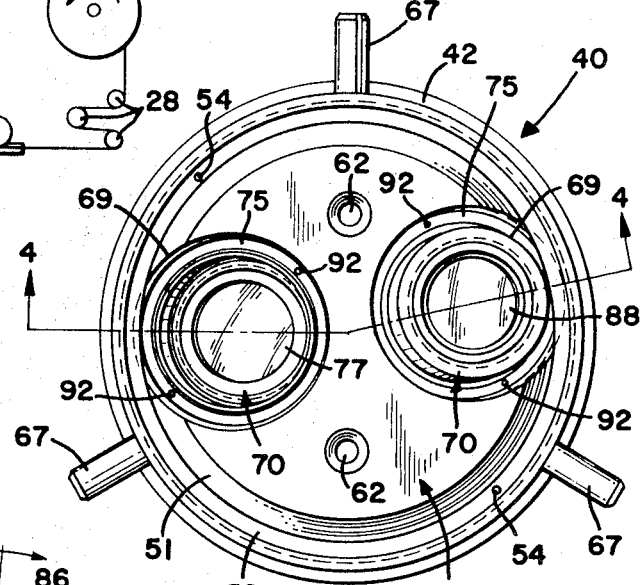
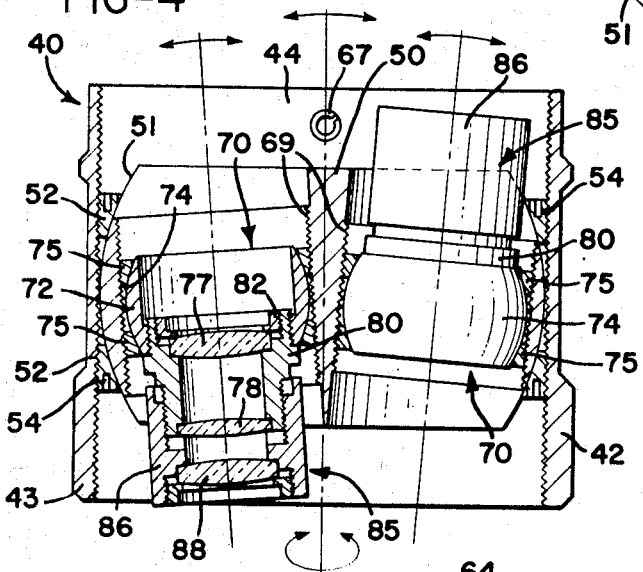
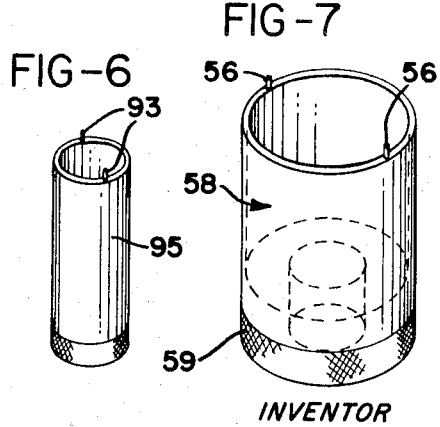
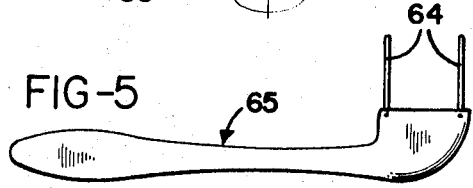
INVENTOR
HAROLD G. FERGUSON
BY
Marechal, Biebel, French & Bugg
ATTORNEYS United States Patent Office 3,563,637
Patented Feb. 16, 1971

3,563,637
ADJUSTABLE PLURAL LENS SYSTEM
Harold G. Ferguson, Dayton, Ohio, assignor to Progressive Industries Corporation, Dayton, Ohio, a corporation of Ohio
Filed May 19, 1969, Ser. No. 825,618
Int. Cl. G02b 7/04
U.S. Cl. 350—255                                    5 Claims

ABSTRACT OF THE DISCLOSURE

Multiple prints of different sizes are produced on a photographic printer incorporating a plurality of lenses each supported for independent universal angular movement within a ball which, in turn, is supported for universal angular movement within a common barrel. The ball is also rotatably and axially adjustable within the barrel, and the lenses are also individually adjustable on their optical axes.

BACKGROUND OF THE INVENTION

In printing apparatus such as the Model 5–S roll paper printer manufactured by Eastman Kodak Company, Rochester, N.Y. and generally disclosed in Pat. No. 3,025,758, it is common to employ a cluster lens system for simultaneously projecting multiple images of different sizes from a single negative onto photosensitive paper extending from a roll. One form of a cluster lens system is disclosed in Pat. No. 3,424,527 and incorporates a plurality of lenses supported within a lens barrel. The lenses are arranged with their optical axes in slight angular relation for projecting plural images from a single negative onto the photosensitive surface of the print paper or material. Usually, each lens is positioned within a corresponding tapered bore formed within the barrel and is cemented after the lens is oriented and positioned with the aid of paper shims.

It has been found that the tedious method of positioning each lens with the use of shims requires significant time even by a person having substantial experience in installing such a lens system on a photographic printer. Furthermore, when it is desired to change the relative positions or sizes of the prints on the print material, it is necessary to remove the cement retaining each lens or to replace the entire lens system.

SUMMARY OF THE INVENTION

The present invention is directed to an improved cluster lens system ideally suited for use on photographic printing equipment such as the Model 5–S roll paper printer manufactured by Eastman Kodak Company. As a primary feature, the lens system of the invention enables each lens to be quickly and precisely positioned by an operator having little or no previous experience in assembling cluster lenses within photographic printing equipment. That is, the lenses are supported for both rotary and linear movement as a unit to provide for generally orienting and focusing the projected images on the photographic paper, and each lens is supported for infinite universal angular movement between predetermined angular limits and also for adjustment on its optical axis to provide for precise positioning and focusing of each image. In addition, each lens may be conveniently locked in position after its orientation and focus is precisely established.

In accordance with a preferred embodiment of the invention, a substantially cylindrical barrel is formed with internal threads, and a fragment of a ball or intermediate support member is supported within the barrel by a pair of axially spaced rings threadably engaging the barrel. The rings provide for universal angular movement as well as rotary and axial movement of the ball within the barrel. A set of angularly disposed threaded bores are formed within the intermediate ball, and a lens unit is supported within each bore by a pair of axially spaced threaded rings engaging a part-spherical surface formed on each lens unit. Thus each lens unit is supported for universal angular adjustment as well as axial adjustment within its corresponding bore. Specifically designed tools are employed for tightening, releasing and adjusting the rings and for orienting the intermediate ball within the barrel.

BRIEF DESCRIPTION OF THE DRAWING

FIG. 1 is a diagrammatic elevational view of photographic printing apparatus incorporating a lens system constructed in accordance with the invention;

FIG. 2 is a view of a typical print produced by the apparatus shown in FIG. 1;

FIG. 3 is an axial or end view of the lens system shown in FIG. 1;

FIG. 4 is an axial section taken generally on the line 4—4 of FIG. 3 with one of the lens units shown in axial section and the other unit shown in elevation; and FIGS. 5–7 are views of special tools employed for adjusting the lens system shown in FIGS. 3 and 4.

DESCRIPTION OF THE PREFERRED EMBODIMENT

Referring to FIG. 1, a web 15 of print material such as photosensitive paper is directed from a supply reel 16 around a series of guide and tension rolls 17 to a takeup reel 18. The two lowermost guide rolls 17 direct the paper web 15 along a horizontal path adjacent the upper surface of a mask 20 having a large square aperture 21 and a smaller square aperture 22. A film negative 25 is directed horizontally below the paper web 15 from a supply reel 26 between a pair of horizontal guide plates 27, around a series of guide rollers 28 to a takeup reel 30. The paper web 15 is intermittently advanced according to a predetermined cycle by a drive (not shown) incorporated in the printing equipment. Similarly, the negative 25 is intermittently advanced in timed relation with the paper web 15 so that the frames on the negative are successively presented in registry with aligned apertures 31 within the guide plates 27. Usually, a color correction filter 32 is positioned below the lower guide plate 27, and a lamp or light source 35 is positioned below the filter 32.

In accordance with the invention, a cluster lens system 40 is positioned between the negative guide plates 27 and the mask 20 for projecting two images from each frame on the negative 25 through the corresponding apertures 21 and 22 within the mask 20 and onto the photosensitive surface of the paper web 15. Referring to FIGS. 3 and 4, the lens system 40 incorporates a primary support member or tubular barrel 42 having internal threads 43 and defining a cylindrical chamber 44. An intermediate support member or ball 50 is disposed within the chamber 44 of the barrel 42 and has a part-spherical outer surface 51 which seats on a pair of lock rings 52 spaced axially within the barrel 42 and having external threads engaging the internal threads 43.

Each of the lock rings 52 is provided with a pair of diametrically opposed axially extending holes 54 for receiving a corresponding pair of pins 56 (FIG. 7) projecting axially from a hollow cylindrical tool 58 having a knurled gripping surface 59. The outer diameter of the tool 58 is slightly smaller than the inner diameter of the chamber 44 so that the tool 58 may be inserted into the chamber to enable the pins 56 to engage the holes 54 for rotating each lock ring 52 to effect axial adjustment of the ball 50 within the barrel 42.

Referring to FIG. 3, a pair of diametrically arranged holes 62 are formed within the upper end surface of the ball 50 for receiving a corresponding pair of parallel spaced prongs 64 (FIG. 5) projecting from a handle-type tool 65. That is, by inserting the prongs 64 into the holes 62, the ball 50 can be universally oriented within the barrel 42 by the tool 65 for reasons which will be explained later. As also shown in FIG. 3, a series of three uniformly spaced pins 67 project radially outwardly from the barrel 42 and are adapted to engage, in a bayonet-like manner, a housing (not shown) of the photographic projection printer and thereby provide for quick installation of the lens system 40 within the printer.

A pair of threaded bores 69 are formed within the intermediate support member or ball 50 and have slightly converging axes (FIG. 4) in addition to being slightly angularly offset (FIG. 3) from a diametrically opposed relation. A corresponding pair of lens units 70 are positioned within the threaded bores 69, and each lens unit includes a partial ball member 72 having a part-spherical outer surface 74 which seats on a pair of axially spaced lock rings 75 having external threads for engaging the corresponding threaded bore 69.

Each of the lens units 70 includes a set of lenses 77 and 78 which are supported in spaced relation by a tubular fitting 80 threadably connected to one end of the corresponding ball member 72. The lens 78 is cemented within a counterbore formed within one end portion of the fitting 80, and the lens 77 is retained by a threaded retaining ring 82 within a counterbore formed within the other end portion of the fitting 80. Each lens unit 70 also incorporates a diopter 85 which inlcudes a fitting 86 threadably engaging the corresponding tubular fitting 80. Each diopter 85 has a lens 88 which cooperates with the corresponding optically aligned lenses 77 and 78 to provide for changing the magnification of each lens unit 70.

Referring to FIG. 3, each of the lock rings 75 is provided with a pair of diametrically opposed and axially extending holes 92 for receiving a corresponding pair of pins 93 (FIG. 6) projecting axially from a hollow cylindrical tool 95. The outer diameter of the tool 95 is slightly less than the diameter of the threaded bores 69 so that the tool 95 can be inserted into each of the bores 69 for adjusting the corresponding lock rings 75 axially within the bore or tightening one of the rings.

After the lens system 40 is installed within the printing apparatus, the lens system 40 is adjusted to project or expose duplicate images of different sizes on the photosensitive paper web 15 so that when the web is developed, it will comprise successively spaced groups of identical prints P of different sizes. The adjustment of the lens system 40 is accomplished by first positioning the lens units 70 within the ball 50 so that their optical axes are substantially parallel. The ball 50 is then oriented within the tool 65 and adjusted axially by rotating the lock rings 52 with the tool 58 until the two images are generally oriented relative to the corresponding apertures 21 and 22 within the mask 20 are in general, focused on a temporary screen (not shown) placed on the mask 20. The rings 52 are tightened to lock the ball 50 in the selected position.

Each of the lens units 70 is then angularly oriented and adjusted axially within its corresponding bore 69 by rotating the lock rings 75 with the tool 95 to obtain precise focusing and centering of its projected image in the corresponding aperture 21 or 22. When precise focusing and orientation is obtained, each set of rings 75 are tightened to secure the lens units 70 in their selected position. The diopter 85 of each lens unit 70 is adjusted to provide the desired magnification and spill-over onto the mask 20.

From the drawing and the above description, it is apparent that a lens system constructed in accordance with the invention provides desirable features and advantages. For example, the support of each of the lens units 70 for infinite universal angular movement between predetermined angular limits relative to the intermediate support member or ball 50, and the support of the ball 50 for infinite universal angular movement between predetermined angular limits relative to the primary support member or barrel 42 enable each of the lens units 70 to be conveniently and precisely positioned according to the desired spacing and orientation of the images projected onto the print web 15. Furthermore, the axial adjustment of each lens unit 70 within its corresponding threaded bore 69 and the axial adjustment of the ball 50 within the barrel 42 provide for obtaining the desired size relation between the finished prints as well as obtaining precise focusing of the images on the print web 15.

As mentioned above, each of the adjustments can be effected conveniently and quickly with the aid of the tools 58, 65 and 95 (FIGS. 5–7) so that the total time required for installing and adjusting the lens system 40 is substantially less than the time required for installing and setting up of a cluster lens system as disclosed in the above mentioned Pat. No. 3,424,527. In addition, the lens system of the invention provides for quickly and conveniently changing the relative angular relation between the lens units 70 when it is desired to change the arrangement or relative sizes of the projected images, as for example, when a print web 15 of a different width is used.

While the lens system herein described constitutes a preferred embodiment of the invention, it is to be understood that the invention is not limited to this precise form of lens system, and that changes may be made therein without departing from the scope and spirit of the invention.

What is claimed is:

1. An improved lens system adapted to be used on photographic printing equipment, comprising a generally cylindrical hollow internally threaded barrel, an intermediate support member disposed within said barrel and having a part-spherical outer surface, a set of externally threaded axially spaced rings engaging said barrel threads and having inner surfaces engaging said part-spherical outer surface to support said support member for universal angular movement between predetermined limits relative to said barrel, means defining a plurality of internally threaded bores within said intermediate support member, a corresponding plurality of lens units disposed within said bores, means forming a part-spherical outer surface on each of said lens units, a set of externally threaded axially spaced rings mounted within each bore in engagement with said bore threads and having inner surfaces engaging said part-spherical outer surface of the corresponding said lens unit and supporting said lens unit for universal angular movement between predetermined angular limits relative to said intermediate support member, and said rings effecting axial adjustment and locking of said intermediate support member and each said lens unit in selected angular positions within said barrel.

2. A lens system as defined in claim 1 wherein said intermediate support member includes means defining parallel spaced holes adapted to receive parallel spaced prongs of a tool to provide convenient orientation of said intermediate support member.

3. A lens system as defined in claim 1 comprising a pair of said bores and corresponding said lens units, and wherein one of said bores and the corresponding said lens unit is angularly offset relative to a plane extending through the axis of said barrel and the axis of the other said lens unit.

4. A lens system as defined in claim 1 wherein each said ring includes a plurality of axially extending spaced holes adapted to receive corresponding pins projecting from a tubular adjusting tool.

5. A lens system as defined in claim 1 wherein the axes of said bores converge.

References Cited

UNITED STATES PATENTS

| | | | |
|---|---|---|---|
| 1,498,177 | 6/1924 | Leonard | 350—255X |
| 1,914,212 | 6/1933 | Ott | 350—75 |
| 2,041,847 | 5/1936 | Marchand | 287—12X |
| 2,143,632 | 1/1939 | Ott | 350—39 |
| 2,285,768 | 6/1942 | Drucker | 350—255 |

D. H. RUBIN, Primary Examiner

U.S. Cl. X.R.

350—77, 252; 355—46